June 5, 1934.  A. J. OTTO  1,961,526
THERMOSTATIC DAMPER CONTROL
Filed Sept. 1, 1932  3 Sheets-Sheet 1
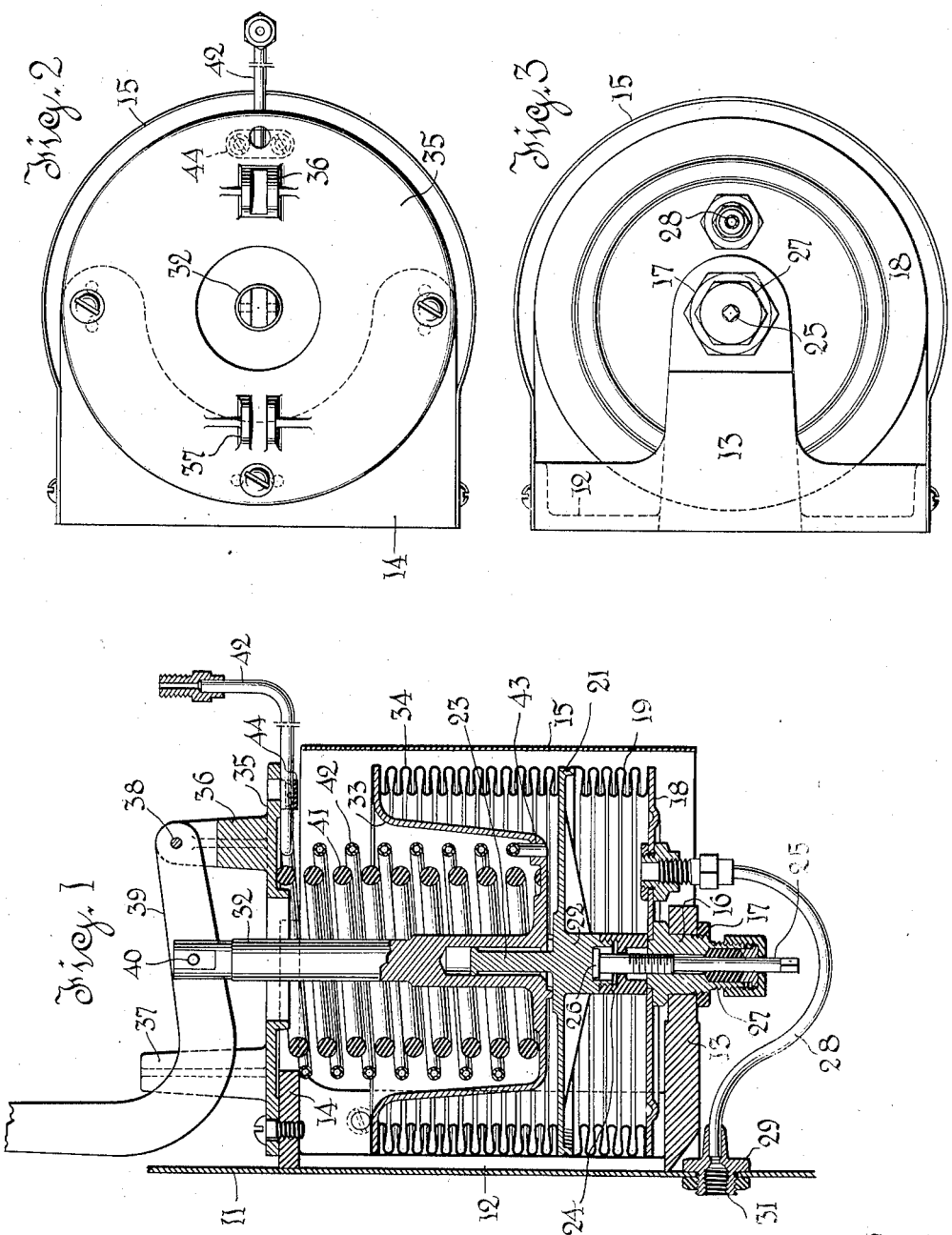

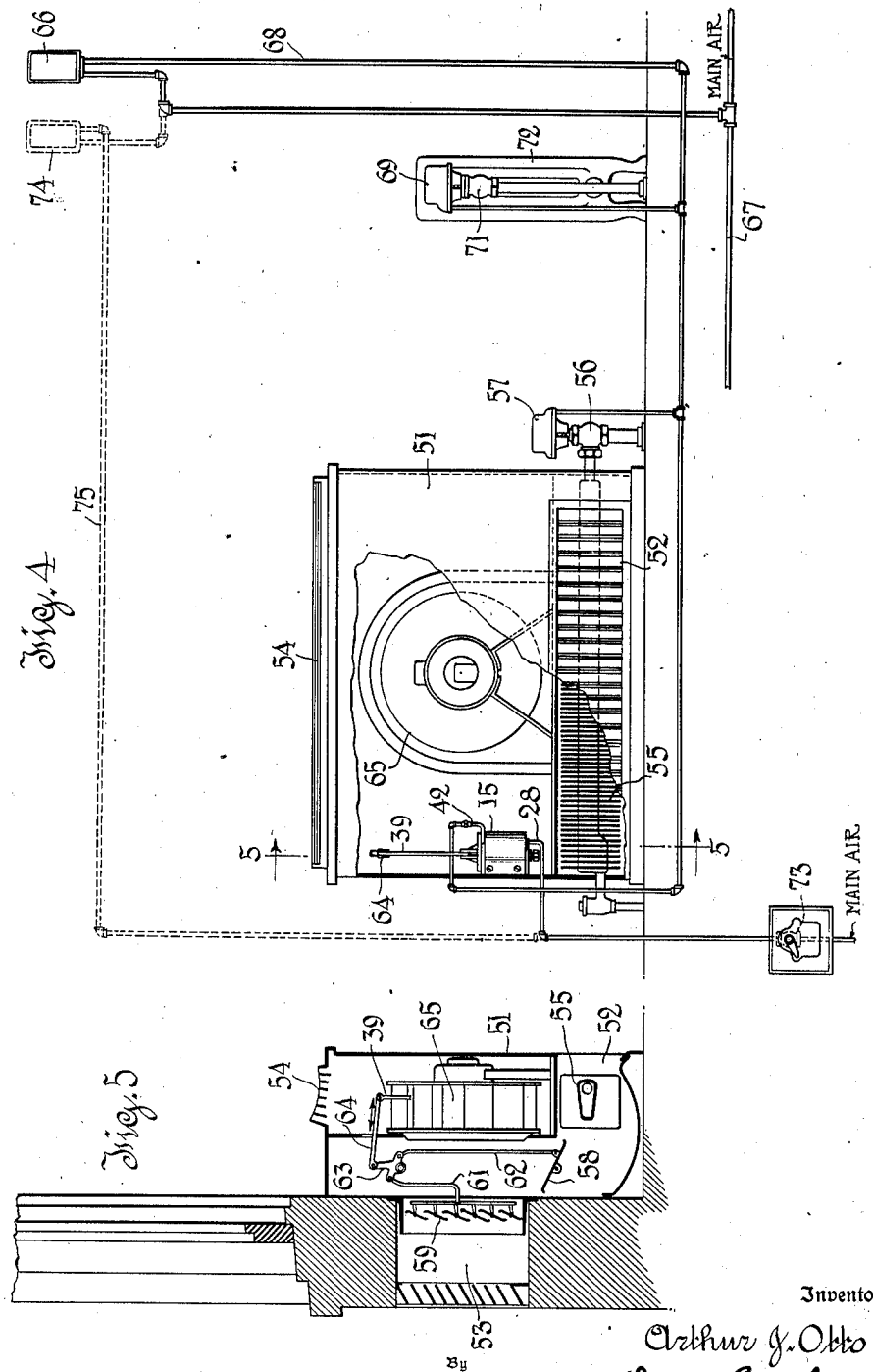

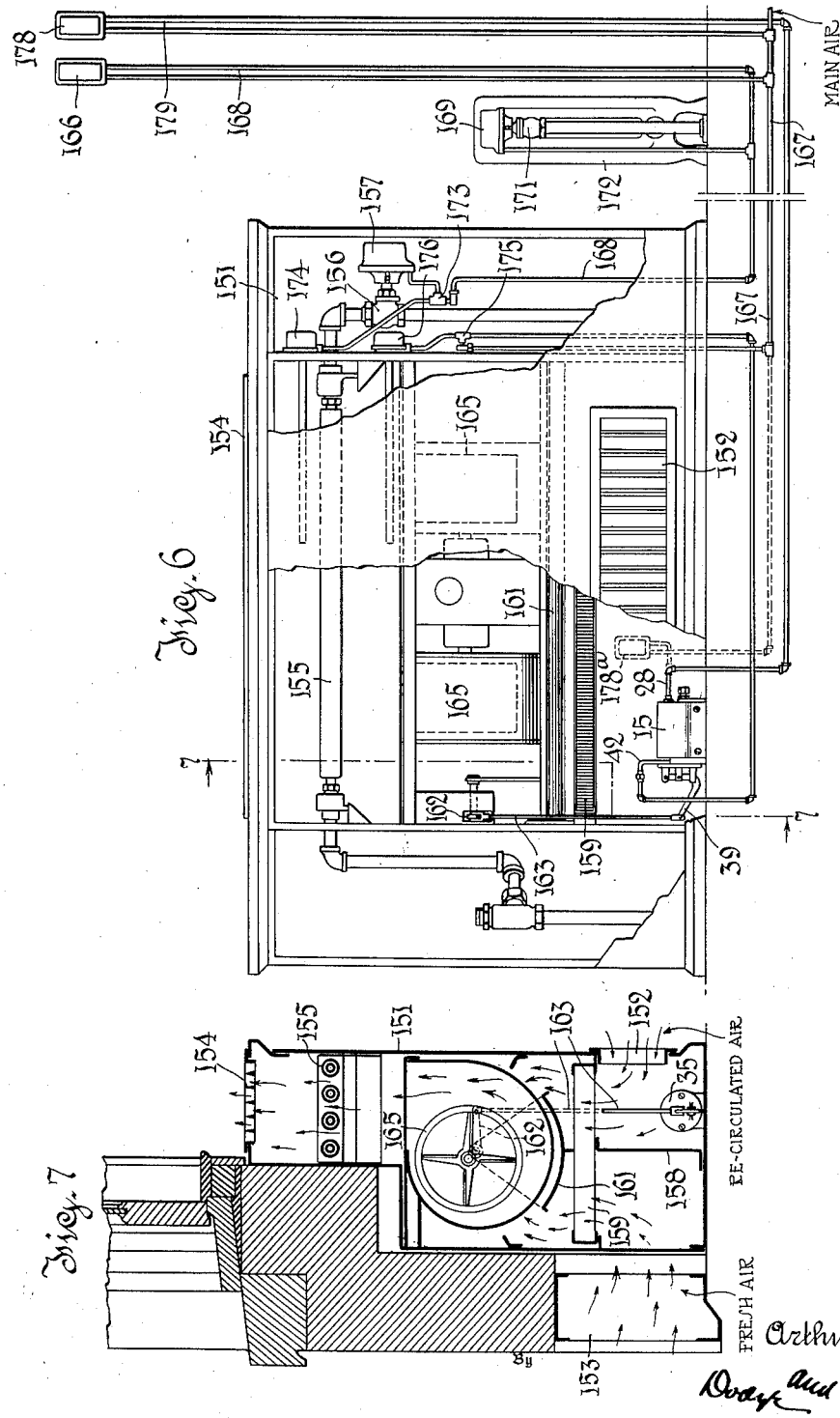

Patented June 5, 1934

1,961,526

UNITED STATES PATENT OFFICE 1,961,526

THERMOSTATIC DAMPER CONTROL

Arthur J. Otto, Milwaukee, Wis., assignor to Johnson Service Company, Milwaukee, Wis., a corporation of Wisconsin Application September 1, 1932, Serial No. 631,424

21 Claims. (Cl. 236—38)

This invention relates to temperature regulation and particularly to temperature regulation by the use of combined heating and ventilating units. While available for use in connection with damper motors generally, the invention has particular utility in conjunction with what is known as a unit heater, and the invention will be described as applied to two specifically different unit heater installations.

Generally stated, a unit heater comprises a casing in which is enclosed a heating unit, such as a radiator, and a circulating fan, the fan serving to draw air either from out of doors or from the room, or from both, and deliver it into the room after causing it to pass in heat exchanging relation with the radiator. It is thus merely a miniature heating system of the duct and fan type.

It has been common practice in the art to cause the fan to draw its supply of air exclusively from out of doors when the fan was operating. In devices of this type it was customary to close the fresh air inlet and open the recirculation inlet when the fan was not in operation. Operating in this way unnecessarily large quantities of fresh air are drawn in in cold weather and an unduly heavy load is placed on the heating plant. Consequently, the present trend is toward the use of a mixing damper which varies the proportions of fresh and recirculated air in response to thermostatic control. Proper ventilation requires that some fresh air be furnished at all times when the room is occupied.

An important purpose of the present invention is to provide motor for actuating the mixing dampers, so arranged that it will operate in two characteristically different ways. For use when the room is unoccupied, the damper is permitted its full range of motion so that it may function to close completely the fresh air inlet. For use when the room is occupied, the motor is limited to a part of its normal range of motion so that it will never function to close completely the fresh air inlet.

The invention will now be described in connection with the accompanying drawings, in which,—

Fig. 1 is a vertical axial section of the diaphragm motor.

Fig. 2 is a plan view thereof.

Fig. 3 is a bottom view with the pipe connection broken away.

Fig. 4 is an elevation of the invention, with parts broken away, applied to a unit heater of a known type, in which the radiator is mounted in the recirculated air inlet so that only recirculated air passes through the radiator. The piping connections are shown diagrammatically.

Fig. 5 is a section on the line 5—5 of Fig. 4.

Fig. 6 is an elevation, with parts broken away, showing the invention applied to a unit heater of the type in which both fresh and recirculated air pass through the radiator. In this view a somewhat different thermostatic control is illustrated. The piping connections are shown diagrammatically.

Fig. 7 is a section on the line 7—7 of Fig. 6.

Referring first to Figs. 1 to 3 inclusive, 11 represents a portion of any suitable support, for example, a wall of a unit heater. Suitably attached to this is a rectangular frame 12 which has projecting from it a lower lug 13 and an upper lug 14. The terms upper and lower are relative and are used on the assumption that the motor is mounted with its axis vertical, as indicated in Fig. 1.

In order to enclose the bellows motor, hereinafter described, a cylindrical casing 15 is used and is connected at its edges with the side edges of the base member 12. Connection is made by screws, as shown. The lower lug 13 is apertured to receive a hub member 16 which is retained by a nut 17 threaded thereon. The hub 16 carries a disk 18 which is welded or otherwise permanently attached to the hub and which serves as the lower head or abutment of the motor structure. Attached to the periphery of the disk 18 is a metallic bellows 19 which is connected at its upper end to a disk-like member 21 which is called the intermediate head, because it is interposed between and is common to two expansible chamber motors. The intermediate head 21 is provided with a downwardly extending hub 22 and with an upwardly extending guide stem or pilot 23.

Threaded to the lower end of the hub 22 is a stop nut 24. This nut is apertured at its center to permit the passage of an adjustable stem 25 which is threaded in the hub 16, as shown, and which carries at its upper end a flange or head 26, too large to pass through the opening in the nut 24. Downward motion of the intermediate head 21 is limited by collision of the stop nut 24 with the head 18. Upward motion of the intermediate head 21 is limited by collision of the nut 24 with the flange or head 26 on stem 25. The range of upward motion permitted to the intermediate head 21 is adjusted by turning the stem 25 by means of a key, the stem being squared at its lower end for this purpose. Leakage around the stem 25 is precluded by a conventional packing gland 27.

Pressure fluid is communicated to the space within the bellows 19 between the heads 18 and 21, through a pipe 28, which is connected through the head 18 by conventional fittings clearly shown in the drawings. In the drawings the opposite end of the pipe 28 is connected to a fitting 29 which is mounted in the wall 11 and which offers at 31 a threaded connection for any suitable branch line, either a thermostat or other device controlling the pressure in the lower section of the motor.

Guided on the pilot stem 23 is the thrust rod 32 of the main bellows motor. This terminates in a dished head 33 whose downward motion is limited by collision with the intermediate head 21, stop lugs being provided to insure a slight separation of the two heads at their point of nearest approach. The periphery of the head 33 and the periphery of the intermediate head 21 are connected by a second metallic bellows 34.

Removably mounted on the lug 14, by means of machine screws is a bracket member 35 which is provided with a central aperture through which the rod 32 may pass, and which carries two slotted lugs 36 and 37. The slotted lug member 36 carries a fulcrum pin 38 for the offset lever 39. A portion of this lever is received in the slot in the lug 37 and is guided thereby. The push rod 32 is pinned to the lever 39 at 40. The member 35 may be mounted on the lug 14 in different angular relations so that the lever just mentioned may project in different directions as may be desired. The member 35 serves as a spring seat for a coil compression spring 41 which reacts downward against the head 33.

Pressure fluid is conducted to the space within the bellows 34 and between the heads 21 and 33 through a flexible metallic tube 42 which is coiled in a progressive spiral, and which is tightly connected to the head 33 at 43, and which is clipped to the member 35 at 44.

When the space between the heads 18 and 21 is vented, the head 21 moves down to its lower limit of motion, as shown in Fig. 1. At such time the head 33 and the lever 39 have their maximum range of motion in response to variations of pressure in the space between the heads 21 and 33. When, however, the space between the heads 18 and 21 is subjected to sufficient pressure, the head 22 moves up until arrested by collision of the nut 24 with the flange 26. This reduces the range of motion of the head 33 and lever 39 and limits their downward motion.

In use the lever 39 is connected to actuate the damper and under the two conditions stated will have a full or partial range of motion, as the case may be.

While not limited to that particular field, the motor was devised chiefly for use in controlling fresh air dampers or combined fresh air and recirculating dampers, either through their entire range of motion or through such partial range of motion as will preclude closing of one of them, usually the fresh air damper.

Referring now to Figs. 4 and 5, 51 represents the casing of a unit heater which has a recirculating air inlet 52, a fresh air inlet 53 and a discharge 54. These inlets and discharges will be provided with the usual louvers and grills, which it is not necessary to describe in the present case. Mounted in the recirculating air inlet 52 is a heat exchanger or radiator 55. Flow of the heat exchanging medium through the radiator is controlled by a valve 56 which is actuated by a bellows motor of familiar form, 57. This bellows motor is of the type which closes the valve when the motor is subjected to pressure.

Mounted in the recirculated air duct beyond the radiator 55 is a recirculating damper 58 which is pivoted at its middle. Mounted in the fresh air inlet 53 is a louver damper 59 of familiar form. The dampers 58 and 59 are connected to be operated in reverse senses by means of the links 61 and 62 and the bell crank 63. The bell crank 63 is connected by link 64 with the upper end of the lever 39, which is the lever already described with reference to Fig. 1. As viewed in Fig. 5 the upper end of the lever 39 moves horizontally, that is to the right and left, the lever being sharply offset as indicated in Fig. 1. The parts are so connected that when the head 33 moves downward it closes the louver damper 59 and opens the recirculation damper 58. It follows that if the intermediate head 21 is moved upward to its limit of motion the head 33 can not move fully downward and consequently the louver damper 59 can not completely close. Air entering through the fresh air inlet 53 or a mixture of air from both sources, is drawn into the electric fan 65 and is discharged by this fan through the openings 54.

To control automatically a unit heater such as just described, use is made of a pneumatic thermostat 66. The thermostat receives air from the main 67, and in response to varying temperature establishes a varying pressure in the branch line 68. Thermostats of this type are well known and have long been manufactured by applicant's assignee, the Johnson Service Company of Milwaukee, Wisconsin.

The branch line 68 is connected to a bellows motor 69 which functions, when subjected to pressure, to close a valve 71 controlling direct radiation 72. It is also connected to the bellows motor 57 which controls the radiator 55, and to the tube 42 which leads to the upper bellows motor, i. e., the space between the heads 21 and 33. As is well known in the art, the bellows motors 69 and 57 are provided with springs which resist the closing of the valve. I prefer so to coordinate the strengths of the springs in motors 69 and 57 and the strength of the spring 41 in the damper motor, that the direct radiation 72 is shut down progressively first, and that the motor 57 next responds, and that finally the damper motor starts to shift the dampers 58 and 59, but this detail is subject to variation.

The tube which conducts pressure fluid to and from the lower bellows motor, i. e., the space between the head 18 and 21, is controlled from a remote point by a three-way valve 73, which acts to admit pressure fluid to the space between the heads 18 and 21 or exhaust it therefrom.

In case an automatic control for the lower bellows motor is desired, I adopt the scheme described in detail with reference to Figs. 6 and 7, i. e., I make use of a second pneumatic room thermostat 74 which receives its air from the main line 67 and which controls the pressure in the branch line 75 connected to the pipe 28. If the room thermostat 74 is used, the three-way valve 73 is omitted. The thermostat 74 is so adjusted that it commences to put pressure on the branch line 25 at a temperature below that at which the thermostat 66 starts to put pressure on the branch line 68. Thus, if the room is cold, the thermostat 74 will vent the line 75 and allow the damper motor to have its full range of motion so that the fresh air dampers will close. However, before the room reaches the normal temperature for occupancy, the thermostat 74 will put sufficient pressure on the branch line 75 and insure that the fresh air dampers will be at least partially open at all times.

Referring now to Figs. 6 and 7, 151 represents a portion of the casing of a unit heater, 152 represents the recirculated air inlet, and 153 the fresh air inlet, while 154 represents the discharge opening into the room. The heating radiator is shown at 155, and in this case is mounted a short distance below the discharge opening 154 so that it acts on both fresh and recirculated air. The steam to the radiator is controlled by a valve 156 and bellows motor 157, of a familiar type. The fresh and recirculated air passages are separated by a partition 158 and lead through different portions of an air filter 159. A single arcuate or roll damper 161 controls both the fresh air and the recirculated air passages, opening one as it closes the other. This damper is rocked by an arm 162 connected by a link 163 with the lever 39 of a damper motor such as illustrated in Fig. 1. This damper motor is identified in Fig. 6 by the numeral 15 applied to its casing.

Two circulating fans are used and are indicated at 165. The fans receive air from the space above the roll damper 161, mix the fresh and recirculated air and discharge them upward through the radiator 155.

To control the device above described, pneumatic thermostats are used. The main air line is shown at 167 and supplies air to a room thermostat 166, which, like the thermostat 66, controls the pressure on its branch line 168. The branch line 168 is connected to the valve motor 169, actuating the valve 171 of direct radiation 172. It is also connected through a restriction 173 with the valve motor 157. The valve motor 157 is connected to the leak port of a pneumatic thermostat 174 which is mounted wholly above the radiator 155. The leak port of the thermostat 174 is closed on rise of temperature, so that under normal conditions it is closed when the thermostat 166 operates the valve motor 157, but if the thermostat 166 should establish a pressure sufficiently high to close the valve 156, and if, as a result thereof, the temperature of air should fall below the setting of thermostat 174, the leak port in the thermostat 174 would vent motor 157 at a rate faster than the thermostat 166 could supply air through the restriction 173. Consequently, the radiator 155 would furnish heat sufficient to keep the discharged air from falling below the desired minimum value.

The main 167 also furnishes air through a restriction 175 to the tube 42, that is, to the upper bellows motor space between the heads 21 and 23. The capacity of the restriction 175, however, is less than the capacity of the leak port of the thermostat 176 which is mounted to be affected by the air discharging from one of the fans 165. Consequently, the thermostat 176 functions to operate the roll damper 161 in such a way as to secure discharge of air from the fans at a constant temperature.

Pressure in the space between the heads 18 and 21 might be controlled by a manually operated valve, as suggested with reference to Figs. 4 and 5, but I prefer to make use of a room thermostat 178 which is supplied with air by the main 167, and which controls pressure in a branch line 179 connected to the tube 28 of the motor 15. The thermostat 178 is adjusted to respond at a relatively lower room temperature, so that the intermediate head 21 will be shifted to insure at least a partial opening of the fresh air damper whenever the room is at or near the temperature of occupancy.

While I prefer to locate the thermostat 178 in the room, as shown, it can be located at any point at which it is affected by room temperature. Consequently, a possible location is inside the unit heater, i. e., within the air circulation inlet 152. Such a location is indicated in dotted lines at 178ª in Fig. 6.

In the arrangements of Figs. 6 and 7, as was the case with reference to the structure shown in Figs. 4 and 5, the direct radiation may be omitted, if desired. Thermostat 166 controls the radiator 155 in response to room temperature, its control being subject to supervision by the minimum stream thermostat 174. The minimum stream thermostat ordinarily comes into operation only in very mild weather when the room temperature rises unduly. The minimum stream thermostat functions merely to prevent cold air from being blown into the room. The mixing dampers are controlled directly by the thermostat subject to the temperature of the mixed air before it is affected by the radiator 155, and controls, therefore, merely a tempering effect by the mixture of fresh and recirculated air. The secondary motor insures that under all conditions of occupancy a certain portion of the air delivered by the fan will be fresh air.

While the invention is primarily intended for use in connection with heating and ventilation, it is also, in some respects, available for use in conjunction with cooling and ventilation. In fact there are already in use devices for cooling rooms which are essentially similar to unit heaters, and some of these operate convertibly as heaters or coolers, according to the circulating medium used.

The double motor arrangement controlling the fresh air damper is intended to permit the fresh air damper to be closed under conditions which exist when the room is not occupied, and insure that it is at least partially open under conditions when the room is occupied. This characteristic is useful irrespective of whether the device operates as a heater or as a cooler, and the claims are intended to be interpreted in this broad scope, unless specifically limited.

What is claimed is:—

1. The combination of a fresh air damper; a recirculated air damper; means for connecting said dampers to cause one to open as the other closes; a motor for actuating said dampers through their normal range of motion; means for controlling said actuating motor; and a second motor operable to limit the motion of the dampers to a portion of said normal range, while maintaining the normal relation between said actuating motor and controlling means.

2. The combination of claim 1, further characterized in that said second motor functions to limit the motion of said dampers to prevent the fresh air damper from completely closing.

3. The combination of a fresh air damper; a recirculated air damper; means for connecting said dampers to cause one to open as the other closes; a motor for actuating said dampers through their normal range of motion; a second motor operable to limit the motion of the dampers to a portion of said normal range; thermostatic means controlling the first-named motor, the relation of said thermostatic means to said motor being unaffected by the second motor; and manually actuated control means for the second-named motor.

4. The combination of a damper; a motor for actuating the same through its normal range of motion; a second motor operable to limit the motion of said damper to a portion of said normal range; thermostatic means controlling the first-named motor, the relation of said thermostatic means to said motor being unaffected by the second motor; and thermostatic means subject to room temperature controlling the second motor.

5. The combination of a fresh air damper; a recirculated air damper; means for connecting said dampers to cause one to open as the other closes; a motor for actuating said dampers through their normal range of motion; a second motor operable to limit the motion of the dampers to a portion of said normal range; thermostatic means controlling the first-named motor, the relation of said thermostatic means to said motor being unaffected by the second motor; and thermostatic means subject to room temperature controlling the second motor.

6. The combination of a damper; a motor for actuating the same through its normal range of motion; a second motor operable to limit the motion of said damper to a portion of said normal range; thermostatic means subject to room temperature controlling the first-named motor, the relation of said thermostatic means to said motor being unaffected by the second motor; and thermostatic means subject to room temperature controlling the second-named motor.

7. The combination of a fresh air damper; a recirculated air damper; means for connecting said dampers to cause one to open as the other closes; a motor for actuating said dampers through their normal range of motion; a second motor operable to limit the motion of the dampers to a portion of said normal range; thermostatic means subject to room temperature controlling the first-named motor, the relation of said thermostatic means to said motor being unaffected by the second motor; and thermostatic means subject to room temperature controlling the second-named motor.

8. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; a thermostat controlling the first and third motors; and independent means for controlling the second motor.

9. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; a thermostat subject to room temperature and controlling the first and third motors; and a second thermostat subject to room temperature and responding at a different temperature from the first thermostat and controlling the second motor.

10. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; a thermostat controlling the first and third motors; independent means for controlling the second motor; and manually adjustable means for limiting the range of motion of the second motor.

11. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the second and third motors; a thermostat subject to the temperature of air leaving said radiator and limiting the controlling effect of said thermostatic means on said third motor; and independent means for controlling the second motor.

12. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; a thermostat subject to room temperature and controlling the third motor; a second thermostat subject to the temperature of air leaving said radiator and serving to limit the effect of the first named thermostat on the third motor; a third thermostat subject to the temperature of air leaving the mixing damper and controlling the first motor; and independent means for controlling the second motor.

13. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; a thermostat subject to room temperature and controlling the third motor; a second thermostat subject to the temperature of air leaving said radiator and serving to limit the effect of the first-named thermostat on the third motor; a third thermostat subject to the temperature of air leaving the mixing damper and controlling the first motor; and a fourth thermostat subject to room temperature, responding at a temperature lower than that for which the first thermostat is set, and controlling said second motor.

14. The combination of a unit heater having a fresh air damper; a motor for moving said damper from open to closed position, a thermostat controlling said motor; a second motor serving when active to limit the motion of said damper to a portion of its normal range so that the damper cannot close, the relation between said thermostat and the damper moving motor being unaffected by the action of the second motor; and means for controlling said second motor from a point remote from the unit heater.

15. The combination of a fixed abutment; a damper; a movable abutment connected with said damper to actuate the same; an intermediate abutment movable relatively to said fixed abutment and interposed between the fixed and movable abutments, bellows connecting said abutments to form two distinct expansible chambers; a connection for conducting pressure fluid to and from the expansible chamber between the fixed and intermediate abutments; yielding means reacting against the movable abutment; and a flexible connection for conducting pressure fluid to and from the expansible chamber between the intermediate abutment and the movable abutment, said connection comprising a metallic tube coiled in a progressive spiral.

16. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the third motor; thermostatic means subject to the temperature of flowing air beyond said dampers and exercising control on the first motor; and independent means for controlling the second motor.

17. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the third motor; thermostatic means subject to the temperature of flowing air beyond said dampers and exercising control on the first motor; and independent thermostatic means controlling the second motor.

18. The combination of a mixing damper mechanism controlling in relatively inverse senses flows of fresh and recirculated air; a motor for actuating said damper mechanism; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the third motor; thermostatic means subject to the temperature of flowing air beyond said dampers and exercising control on the first motor; and thermostatic means subject to room temperature and controlling the second motor.

19. The combintion of a mixing damper mechanism controlling, in relatively inverse senses, flows of fresh and recirculated air; a motor for actuating said damper mechanism; thermostatic means for controlling said motor; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the third motor; a thermostat subject to the temperature of the discharging air and limiting the controlling effect of said thermostatic means on said third motor; and independent means for controlling said second motor.

20. The combination of a mixing damper mechanism controlling, in relatively inverse senses, flows of fresh and recirculated air; a motor for actuating said damper mechanism; thermostatic means for controlling said motor; a second motor operable to limit the motion of said damper mechanism to a portion of its normal range; a radiator arranged to exchange heat with at least a portion of the air controlled by said damper mechanism; a third motor controlling the supply of heat exchanging medium to said radiator; thermostatic means subject to room temperature and controlling the third motor; a thermostat subject to the temperature of the discharging air and limiting the controlling effect of said thermostatic means on said third motor; and independent thermostatic means subject to room temperature for controlling said second motor.

21. The combination of a damper; a motor for actuating the same through its normal range of motion; means for controlling said actuating motor; and a second motor operable to limit the motion of the damper to a portion of said normal range, while maintaining the normal relation between said actuating motor and controlling means.

ARTHUR J. OTTO.